United States Patent [19]

Juechter

[11] Patent Number: 4,779,893

[45] Date of Patent: Oct. 25, 1988

[54] STRUT TYPE VEHICLE WHEEL SUSPENSION

[75] Inventor: Tadge J. Juechter, Troy, Mich.

[73] Assignee: General Motors Corporation, Detroit, Mich.

[21] Appl. No.: 100,539

[22] Filed: Sep. 24, 1987

[51] Int. Cl.$^4$ ............................................. B60G 15/00
[52] U.S. Cl. ..................................... 280/668; 280/692
[58] Field of Search ................ 280/668, 692, 697, 715

[56] References Cited

U.S. PATENT DOCUMENTS 3,727,940  4/1973  Hug ..................................... 280/668
4,688,774  8/1987  Warmuth, II ....................... 280/692

FOREIGN PATENT DOCUMENTS 63016   10/1982  European Pat. Off. ............ 280/697
2431675  1/1976  Fed. Rep. of Germany ...... 280/668
840909   7/1960  United Kingdom ............... 280/697

Primary Examiner—Ross Weaver
Attorney, Agent, or Firm—Dean L. Ellis

[57] ABSTRACT

Vehicle strut type suspensions are improved against deleterious side loadings and excessive friction in the telescopic strut portions by use of a couple counterbalance secondary spring which imposes a countermoment on the strut-connected wheel support knuckle.

2 Claims, 2 Drawing Sheets

STRUT TYPE VEHICLE WHEEL SUSPENSION

This invention relates to automotive wheel suspensions of the type employing a generally vertically oriented, telescopic tubular strut as an upper guidance element for the vehicle road wheel. In such suspensions, the telescopic strut is intended to extend or foreshorten from its so-called design or normal laden length, as a result of road or load variations, unimpeded by any appreciable frictional resistance between its telescopically joined parts, thereby to achieve optimum, predictable ride comfort qualities over the road. In MacPherson, Chapman, and other strut layouts, the strut incorporates the usual hydraulic damper unit and, again, it is intended that the rather precisely controlled hydraulic damper function be substantially unaffected by additional frictional disturbances attending the telescopic strut motion.

The frictional resistance in the strut to purely axial loading therein is easily controlled. However, when designing strut suspension geometry to meet other vehicle handling or packaging considerations, the strut is often unavoidably subjected to loadings applied at such angles to the strut axis and at such levels as not to be easily controlled in their effect on the comfort qualities desired in passenger car travel. Substantial side forces and friction in the strut result from the imposition on the lower wheel-carrying end of the strut of a moment, or force couple, created when the suspension geometry does not afford substantial alignment, at the wheel center plane, of the applied weight of the spring chassis mass over the wheel and the opposing ground reaction force.

Allison U.S. Pat. No. 3,362,498 illustrates an example of the foregoing and one solution thereto, in the environment of a strut suspension wherein the primary suspension spring is mounted atop the strut.

The present invention contemplates the more difficult situation of a primary suspension spring placed elsewhere within the layout, such as not to be amenable to simple offset of its axis, as in Allison, to align forces and reduce couples on the strut. Particularly, it contemplates other suspension layouts wherein the lower end of the strut fixedly connects with the wheel-carrying member or knuckle, where a lateral lower control or guide arm on the sprung chassis mass also connects with the knuckle, and where the primary suspension spring is placed in the layout so as to transfer the sprung mass weight to the knuckle directly, or via the control arm, or otherwise in avoidance of the strut. In the interest of achieving lower front end vehicle profiles, or otherwise, such layouts are often desirable.

To foreclose strut friction or binding phenomena in such layouts, the present invention features a couple counterbalance arrangement. In a preferred form, the counterbalance includes a secondary spring element installed in the layout to apply to the knuckle a moment which opposes the moment applied thereto by the primary loadings. The spring element may take a variety of forms but, as preferred, is constituted of an elastomer block or alternatively, a torsion cable, connected with the knuckle to normally experience a deforming load resulting in the desired counter-moment on the suspension strut.

These and other objects, features and advantages of the invention will be readily apparent from the following specification and from the drawings, wherein.

Figure 1:
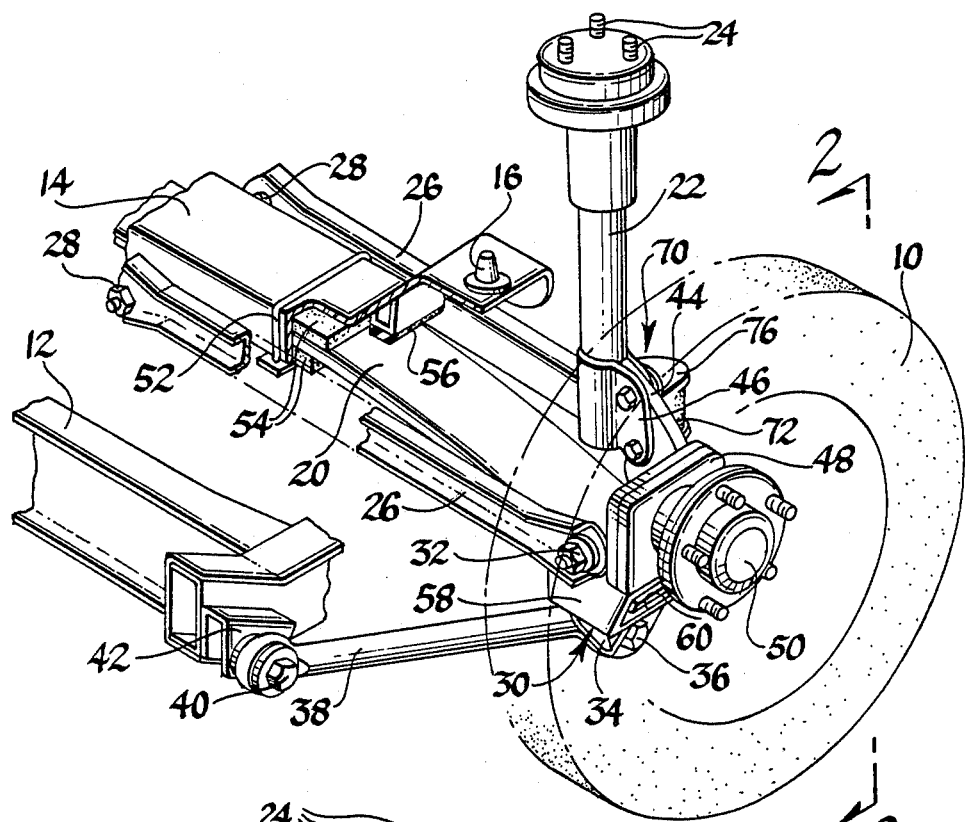
FIG. 1 is a fragmentary, partially broken away perspective view of a vehicle wheel suspension in accordance with the invention.

Referring now particularly to FIG. 1 of the drawing; the same illustrates in fragmentary fashion a vehicle suspension according to the invention for a road wheel assembly 10 located at one side of the vehicle, and for illustrative purposes only the rear end thereof. It will be understood that in the specific embodiment discussed hereinafter for this one wheel, a mirror image complementary suspension structure exists at the opposite vehicle side for the opposite road wheel.

The chassis and body forming the sprung mass of the vehicle is represented in the drawings by structural units thereof including a cross-member 12 which may be welded or otherwise rigidly unitary within the chassis, and a further suspension module cross-member 14 having kicked-up end portions, one of which is shown, and including suitable fastener attachment 16 to enable modular subassembly of the vehicle suspension and subsequent joining thereof to the main vehicle chassis. Such cross-member 14 is of generally uniform channel section from end to end to house therewithin the primary suspension leaf spring 20. Such spring is adapted to bear the vehicle sprung mass 12, 14 upon the unsprung mass including wheel assembly 10 and its opposite at the other side of the vehicle.

In the specific embodiment disclosed, the vehicle suspension includes a strut type wheel guidance arrangement including a shock strut 22 of well known character embodying the telescopic portions housing a hydraulic damper therewithin and, at the upper such telescopic portion, suitable fasteners 24 for securing the same to an elevated chassis portion of the vehicle, not shown. A pair of lateral control arms 26 of generally identical shallow channel configuration extend from proximate the longitudinal centerline of the vehicle, alongside the transversely extending crossmembers 14, and are pivotally joined thereto by suitable conventional rubber-bushed pivot joints 28 adjacent such longitudinal center line. The control arms 26 extend substantially transversely to a like pivotal connection at their respective outboard ends with respective rubber-bushed pivot joints 32 of a wheel support knuckle or member 30 upon which wheel 10 is mounted in conventional fashion, the knuckle being shown in more detail in FIG. 2. As seen therein, the knuckle 30 includes a lower extension 34 securing by way of a further pivot joint 36, similar to pivot 32, the distal end of a trailing link or radius rod 38. Such rod is secured by another such rubber-bushed pivot joint 40 by suitable bracketry 42 to the chassis cross member 12.

Thus, the illustrated suspension is of the so-called "tri-link" type, i.e. a combination of two lateral and one longitudinal control links situated at the lower portions of the vehicle chassis to coact with the shock strut 22 for wheel and wheel support guidance during ride motions between the sprung and unsprung masses in operation. In addition to these links, or portions thereof, the unsprung mass of course includes knuckle 30 and associated brake and other elements, along with wheel assembly 10. The coaction of the shock strut 22 is accomplished by rigid securement of the lower end of an upper extension 44 of the knuckle 30, as by use of a conventional saddle type bracket 46 welded to the lower telescopic portion of the strut and affixed at its flanges by bolts through aligned apertures in the knuckle 30. The knuckle 30 further includes the usual wheel hub and brake apparatus mounting plate 48 carrying the wheel hub assembly 50 by conventional means.

Suspension spring 20 serves as the primary resilient medium supporting the sprung mass on, in this illustrated embodiment, a suitable supporting surface to be described, directly within knuckle 30 and acts as the spring medium independently of any function of lateral guidance such as provided by control arm 26. The spring is secured at its inboard region to the cross-member 14 by way of a pair of separate U-bolt and bracket fasteners 52, one of which is shown, and suitably separated from each other, either side of the longitudinal center line, to obtain resilient reaction not only to ride motion between the sprung and unsprung masses but also to opposite wheel deflections as under centrifugal force during cornering. Suitable polymeric mounting blocks, indicated at 54, capture the resilient spring 20 within cross-member 14 under the clamping force of fasteners 52. It is contemplated that spring 20 may advantageously be of a composite structure of fiber glass reinforced polyester or like polymeric resin featuring very high modulus characteristics and relatively light weight. The mounting blocks 54 are structured to avoid degradation of the spring as by abrasion and entry of foreign material from the road. Opposite jounce bumpers, one of which is indicated at 56, are installed on the underside of cross-member 14 to engage the upper surface of spring 20 during extreme upward deflection of the wheel assembly 10.

Referring again to FIGS. 1 and 2, the outboard or distal end of spring 20 is received in a special cavity of knuckle 30 formed within a medial portion 58 thereof. Such medial portion is cast or forged with an opening receiving within the outlines thereof the end of the spring 20, the spring end bearing on an upwardly facing knuckle surface 60. Thus, the spring 20 imposes upon the knuckle the allocated portion of the weight of the vehicle sprung mass, i.e. downward force Fw. It is seen that due to packaging space considerations, such force of the spring end is spaced substantially laterally inwardly from the longitudinal effective center plane of road wheel 10 as indicated by broken line, whereat is located the theoretical ground reaction force $F_w'$. The result is, of course, a clockwise force couple $M_1$ imposed on knuckle 30 and strut 22, resulting in an inboard side loading on the latter as indicated by the reference arrows.

Figure 2:
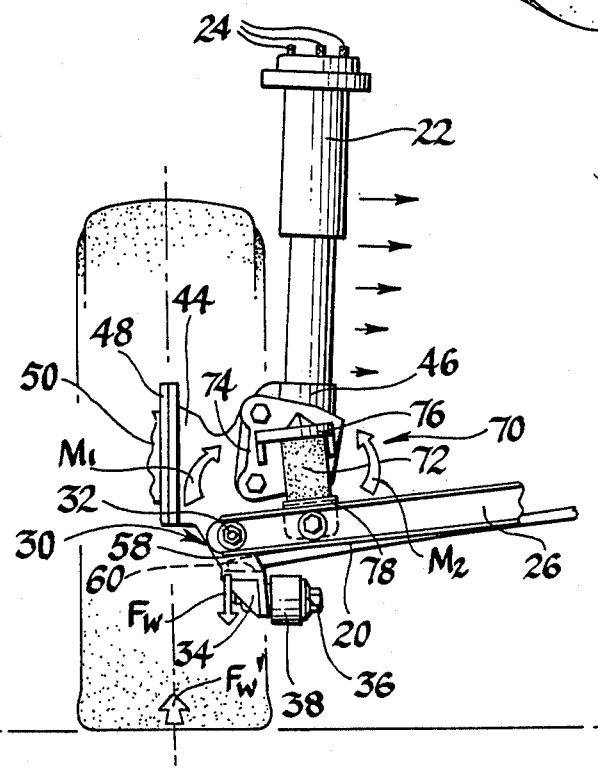
FIG. 2 is an enlarged elevational view taken in a direction indicated by lines 2—2 of FIG. 1.
Figure 3:
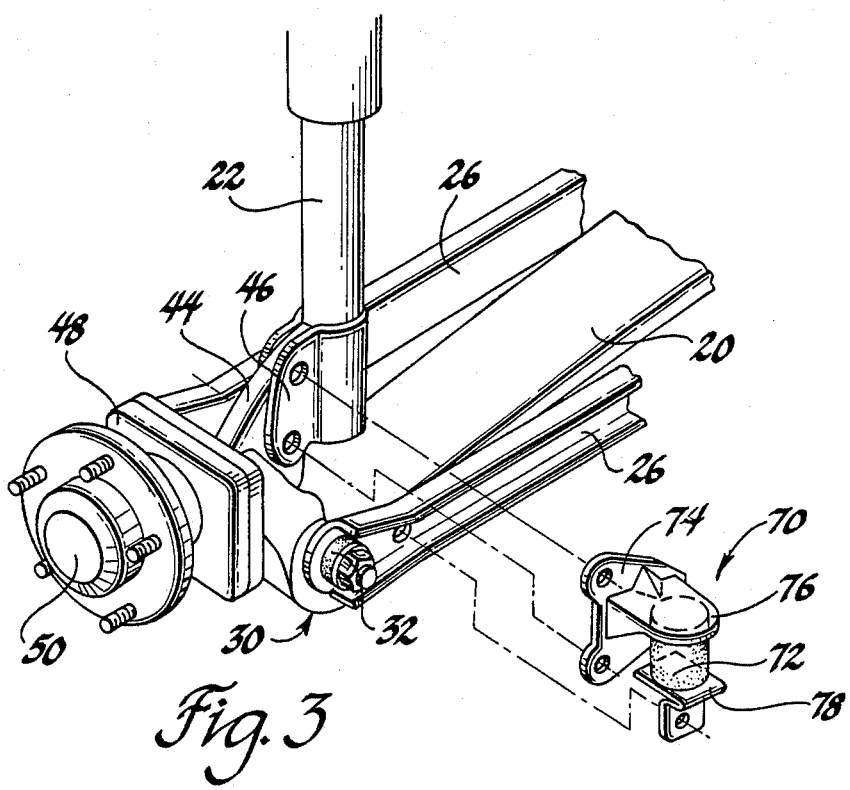
FIG. 3 is an enlarged fragmentary perspective view, partly exploded, in a direction similar to FIG. 2.

Referring now to FIGS. 2 and 3, a secondary spring or counterbalance couple device for attenuating or eliminating such side loading, designated generally as 70, includes a cylindrical rubber or similar elastomer block 72 arranged normally in predetermined compressed deformation between seats on one lateral control arm 26 and on the knuckle 30. Thus, a multiple surfaced bracket 74 is bolted by one flange thereof to the saddle bracket 46 at the lower end of strut 22, and it includes a rearwardly extending seating flange 76 engaged with the upper surface of block 72. The lower surface of the latter seats on another bracket 78 bolted to control arm 26. With the vehicle in its normal "design" or nominally laden condition, the block 72 is sufficiently deformed or compressed as to exert an upward force on knuckle 30 resulting in a counterclockwise moment $M_2$. This moment, by proper selection of the modulus and free dimensions of block 72, will be sufficient to effectively neutralize moment $M_1$, preferably even during jounce or rebound travel in the suspension to any degree altering the relative positions of spring seats 76 and 78. Accordingly, side loading in strut 22 arising from the use of primary spring 20 in the layout described, is alleviated and suspension ride quality restored.

It will be recognized that the particular illustrated layout utilizing transverse leaf spring 20 has many parallels, such as the case of a primary coil suspension spring seated between the chassis sprung mass and, say, a lateral control arm such as arm 26. There, a similar situation for Fw, Fw' and moment $M_1$ can result, and the counterbalance of this invention has equal utility.

Figure 4:
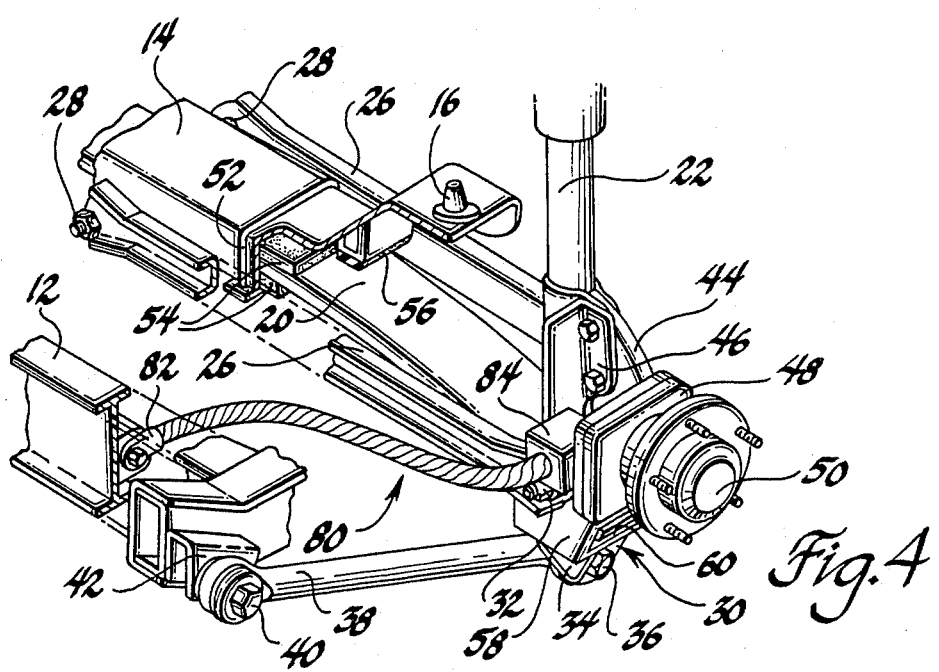
FIG. 4 is a view similar to FIG. 1 showing an alternative embodiment.

Apparent also are some useful alternatives for specific secondary spring counterbalance means. In FIG. 4, like suspension parts are designated with the same numerals as in FIG. 1, except for a counterbalance device designated generally as 80. Here, it takes the form of a torsion cable of, for example, multiple wraps or layers of stranded stainless steel wire bundles, joined at either end in anchor couplings 82 and 84. Coupling 82 may be bolted against rotation on bracket 42 of the chassis and, with the torsion cable prestressed or deformed in torsion to a desired torque value operative for the design or nominally laden condition of the car, the coupling 84 is attached to knuckle 30 in a manner to apply the aforedescribed counterclockwise couple $M_2$ (FIG. 2).

Equally practical may be the use, again, of an elastomer block as in FIG. 1 but relocated to a less crowded area such as in a kick-up area of a longitudinal chassis member. There, the force of the compressed block may be transmitted to knuckle 12 in the appropriate couple sense by use of a swingable link or the like.

The embodiments of the invention in which an exclusive property or privilege is claimed are defined as follows:

1. Vehicle wheel suspension comprising a telescopic guidance strut oriented generally vertically in the vehicle, an unsprung mass including a roadwheel and a roadwheel support member fixed to the lower end of said strut, primary suspension spring means for supporting the sprung mass of the vehicle upon the unsprung mass at a location on the latter spaced laterally of the center longitudinal plane of the roadwheel containing the effective ground reaction force, whereby said unsprung mass experiences a laterally applied force couple sustainable in the telescopic parts of said strut, and a couple counterbalance torsionally compliant stranded cable member fixed at its ends in a normally deformed condition, one such end being connected to said roadwheel support member so as to apply a lateral moment thereon of opposite hand to that of said force couple.

2. Vehicle wheel suspension comprising a telescopic guidance strut oriented generally vertically in the vehicle, a lower control arm extending laterally in the vehicle, an unsprung mass including a roadwheel and a roadwheel support member fixed to the lower end of said strut and pivotally secured to the outboard end of said control arm, primary suspension spring means for supporting the sprung mass of the vehicle upon the unsprung mass at a location on the latter spaced laterally inboard of the center longitudinal plane of the roadwheel containing the effective ground reaction force, whereby said unsprung mass experiences a laterally applied force couple sustainable in the telescopic parts of said strut, and a couple counterbalance elastomeric body installed in a normally compressed condition between its ends, one such end being connected to said wheel support member to apply to the latter a moment of opposite hand to that of said force couple.

* * * * *